United States Patent [19]
Nodera et al.

[11] Patent Number: 6,150,443
[45] Date of Patent: Nov. 21, 2000

[54] FLAME-RETARDANT POLYCARBONATE RESIN COMPOSITION AND ITS INJECTION MOLDINGS

[75] Inventors: Akio Nodera; Naoki Mitsuta, both of Ichihara, Japan

[73] Assignee: Idemitsu Petrochemical Co., Ltd., Tokyo, Japan

[21] Appl. No.: 09/369,892

[22] Filed: Aug. 9, 1999

[30] Foreign Application Priority Data

Aug. 13, 1998 [JP] Japan ................................. 10-228857

[51] Int. Cl.$^7$ ................................. C08K 5/42; C08K 3/30
[52] U.S. Cl. ........................ 524/157; 524/537; 524/556; 524/115; 524/141; 524/442; 524/81; 524/158; 524/161; 525/70; 525/88; 525/462; 558/211; 568/852; 554/227
[58] Field of Search ..................... 524/537, 566, 524/115, 141, 442, 81, 157, 158, 161; 525/70, 88, 462; 558/211; 568/852; 264/328.1, 328.17

[56] References Cited

U.S. PATENT DOCUMENTS

| | | | |
|---|---|---|---|
| 5,837,757 | 11/1998 | Nodera et al. | 524/87 |
| 5,900,446 | 5/1999 | Nishihara et al. | 524/127 |
| 5,994,463 | 11/1999 | Eckel et al. | 525/67 |

FOREIGN PATENT DOCUMENTS 379039  7/1990  European Pat. Off. .

*Primary Examiner*—Robert Dawson
*Assistant Examiner*—Kao-Liang Peng
*Attorney, Agent, or Firm*—Oblon, Spivak, McClelland, Maier & Neustadt, P.C.

[57] ABSTRACT

Provided are a flame-retardant polycarbonate resin composition capable of being formed into moldings having good impact resistance, high strength and good thermal stability that are intrinsic to polycarbonate resins and having good antistatic properties and good flame retardancy, and also injection moldings of the composition. The composition comprises 100 parts by weight of a resin or resin mixture of (A) from 50 to 100% by weight of a polycarbonate resin and (B) from 0 to 50% by weight of a styrenic resin, from 1 to 50 parts by weight of (C) a flame retardant, and from 0.1 to 5 parts by weight of (D) an anionic antistatic agent, and has a sodium sulfate content of at most 0.05% by weight. Optionally, the composition may contain (F) a fluoro-olefinic resin, (G) a rubber-like elastomer, and (H) an inorganic filler.

18 Claims, No Drawings

FLAME-RETARDANT POLYCARBONATE RESIN COMPOSITION AND ITS INJECTION MOLDINGS

BACKGROUND OF THE INVENTION

1. Field of the Invention

The present invention relates to a flame-retardant polycarbonate resin composition and its injection moldings. More precisely, it relates to a flame-retardant polycarbonate resin composition and its injection moldings, of which the impact resistance has been improved without lowering their flame retardancy and thermal stability, and which have good antistatic properties.

2. Description of the Related Art

As having the advantages of impact resistance, heat resistance and good electric properties, polycarbonate resins have many applications in various fields of, for example, office automation appliances, electric and electronic appliances, car parts and building materials. However, there are some problems with polycarbonate resins in that they require high molding and working temperatures and their melt fluidity is low. Therefore, they require relatively high molding temperatures. In particular, when various additives are added thereto, their thermal stability is often lowered, and, in addition, they could not often exhibit their good properties.

As a rule, polycarbonate resins are self-extinguishable. However, some of their applications to office automation appliances, electric and electronic appliances and others require high-level flame retardancy. To meet the requirement, various flame retardants are added to polycarbonate resins. As having high electric resistance like other ordinary plastics, polycarbonate resins are electrostatically charged with ease when rubbed or contacted with others. Charged polycarbonate resins are often problematic in that they receive electric shock when discharged or receive dust adhering thereto, by which their outward appearance is degraded. In particular, when moldings of polycarbonate resins for office automation appliances and other electric and electronic appliances such as those mentioned above are electrostatically charged, they cause IC errors. Given that situation, required are some measures for preventing polycarbonate resins from being electrostatically charged.

For preventing polycarbonate resins from being electrostatically charged, some methods have heretofore been tried. For example, water-absorbing hydrophilic compounds such as polyalkylene oxides, or antistatic agents are added to polycarbonate resins, or are applied to moldings of polycarbonate resins. However, as polycarbonate resins require high molding temperatures, such additives to them could not attain satisfactory antistatic effects. In particular, for flame-retardant polycarbonate resins to which are added some flame retardants, few concrete proposals have heretofore been made for making them have satisfactory antistatic properties without sacrificing the other characteristics intrinsic to them.

On the other hand, moldings for parts and housings for office automation appliances such as duplicators and facsimiles and for other electric and electronic appliances such as those mentioned above shall have a complicated shape with local projections or depressions, for example, having ribs or bosses therewith, and are required to be lightweight and thin-walled from the viewpoint of resources saving. Therefore, desired are polycarbonate resin compositions having increased melt fluidity, or that is, having increased injection moldability. Various polycarbonate resin compositions having increased moldability have heretofore been proposed, to which are added rubber-like polymer-modified styrenic resins in consideration of the physical properties such as impact resistance of the moldings of the compositions. However, no concrete method is known for improving the antistatic properties of polycarbonate resins.

On the other hand, compositions of polycarbonate resins to which are added styrene resins such as acrylonitrile-butadiene-styrene resins (ABS resins), acrylonitrile-styrene resins (AS resins) and the like are known as polymer alloys, and have many applications in the field of moldings as having good heat resistance and impact resistance. Of their applications, where such polycarbonate resin compositions are used for office automation appiances, electric and electronic appliances and others, they are required to have high flame retardancy of not lower than a predetermined level so as to ensure and increase the safety of their moldings.

To meet the requirements as above, various methods have heretofore been proposed. Concretely, JP-A 61-55145 discloses a thermoplastic resin composition comprising (A) an aromatic polycarbonate resin, (B) an ABS resin, (C) an AS resin, (D) a halogen compound, (E) a phosphate, and (F) a polytetrafluoroethylene component. JP-A 2-32154 discloses a molding polycarbonate composition with high flame retardancy and high impact resistance, comprising (A) an aromatic polycarbonate resin, (B) an ABS resin, (C) an AS resin, (D) a phosphate, and (E) a polytetrafluoroethylene component. JP-A 8-239565 discloses a polycarbonate resin composition comprising (A) an aromatic polycarbonate, (B) an impact-resistant polystyrene resin with rubber-like elasticity, (C) a halogen-free phosphate, (D) a core/shell-type grafted rubber-like elastomer, and (E) talc.

These are all to improve the melt fluidity and therefore the moldability of polycarbonates, and to improve the impact resistance and the flame retardancy of the moldings of polycarbonates. As having such improved properties, the polycarbonate compositions proposed are formed into various practicable moldings. However, in special fields of office automation appliances, electric and electronic appliances especially those for household use, etc., parts and housings of those appliances are required to be more lightweight and thin. In particular, their shape is being more complicated to have fine projections and depressions such as ribs and bosses therewith or have a lattice structure, so that they are applicable to any complicated and large-sized appliances.

Polycarbonate resin compositions containing any of ABS resins, rubber-modified polystyrenic resins (HIPS) and the like are problematic in that their thermal stability is poor, and, in addition, it is extremely difficult to make the compositions have good antistatic properties without interfering with their flame retardancy. In this connection, adding additives such as antioxidants to polycarbonate resins has been proposed, which, however, could not still solve the substantial problems with the resins.

SUMMMARY OF THE INVENTION

In that situation, the object of the present invention is to provide an improved, flame-retardant polycarbonate resin composition having good antistatic properties and still having good flame retardancy and thermal stability. The composition has good moldability and is formed into moldings having high impact resistance, high strength, good flame retardancy and good antistatic properties and therefore well applicable even to thin-walled and complicated office automation appliances, electric and electronic appliances for industrial and household use and car parts. The invention also provides the injection moldings of the composition.

To attain the object as above, we, the present inventors have assiduously studied various antistatic additives that may be applicable to flame-retardant polycarbonate resin compositions. As a result, we have found that, when a specific additive is selectively added to a polycarbonate resin composition containing a flame retardant, especially to that additionally containing a rubber-modified styrenic resin, and when the amount of a specific component in the composition is specifically controlled to be not higher than a specific proportion, then we can obtain moldings of the composition having greatly improved impact resistance and good antistatic properties and still having good flame retardancy. On the basis of these findings, we have completed the present invention.

(1) A flame-retardant polycarbonate resin composition, which comprises 100 parts by weight of a resin or resin mixture of (A) from 50 to 100% by weight of a polycarbonate resin and (B) from 0 to 50% by weight of a styrenic resin, from 1 to 50 parts by weight of (C) a flame retardant, and from 0.1 to 5 parts by weight of (D) an anionic antistatic agent, and which has a sodium sulfate content of at most 0.05% by weight.

(2) The flame-retardant polycarbonate resin composition of (1), which additionally contains from 0.1 to 5 parts by weight, relative to 100 parts by weight of the resin or resin mixture of (A) and (B), of (E) at least one selected from alkylene glycols, glycerins and their esters with fatty acids.

(3) The flame-retardant polycarbonate resin composition of (1) or (2), wherein the flame retardant is a non-halogen phosphate.

(4) The flame-retardant polycarbonate resin composition of any one of (1) to (3), which additionally contains from 0.05 to 5 parts by weight, relative to 100 parts by weight of the resin or resin mixture of (A) and (B), of (F) a fluoro-olefinic resin.

(5) The flame-retardant polycarbonate resin composition of (4), wherein the fluoro-olefinic resin has the ability to form fibrils.

(6) The flame-retardant polycarbonate resin composition of any one of (1) to (5), wherein the resin mixture comprises (A) from 50 to 95% by weight of a polycarbonate resin and (B) from 5 to 50% by weight of a styrenic resin, and the styrenic resin is a rubber-like polymer-modified styrenic resin.

(7) The flame-retardant polycarbonate resin composition of any one of (1) to (6), which additionally contains from 1 to 30 parts by weight, relative to 100 parts by weight of the resin or resin mixture of (A) and (B), of (G) a rubber-like elastomer.

(8) The flame-retardant polycarbonate resin composition of (7), wherein the rubber-like elastomer (G) is a core/shell-type, grafted rubber-like elastomer.

(9) The flame-retardant polycarbonate resin composition of any one of (1) to (8), which additionally contains from 1 to 50 parts by weight, relative to 100 parts by weight of the resin or resin mixture of (A) and (B), of (H) an inorganic filler.

(10) An injection molding of the flame-retardant polycarbonate resin composition of any one of (1) to (9).

(11) The injection molding of (10), which is for housings or parts of office automation appliances, or for those of electric and electronic appliances for household use or industrial use.

DETAILED DESCRIPTION OF THE INVENTION

The invention is described in detail hereinunder. First mentioned are the components (A) to (C) constituting the flame-retardant polycarbonate resin composition of the invention.

(A) Polycarbonate Resin (PC):

The polycarbonate resin serving as the component (A) in the resin composition is not specifically defined, and may be any and everyone known in the art. Generally used are aromatic polycarbonates to be produced from diphenols and carbonate precursors. For example, used are polycarbonates as produced by reacting a diphenol and a polycarbonate precursor in a solution method or in a melt method, such as those as produced through reaction of a diphenol and phosgene or through interesterification of a diphenol and a diphenyl carbonate.

Various diphenols are usable, including, for example, 2,2-bis(4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkanes, bis(4-hydroxyphenyl) oxide, bis(4-hydroxyphenyl) sulfide, bis(4-hydroxyphenyl) sulfone, bis (4-hydroxyphenyl) sulfoxide, bis(4-hydroxyphenyl) ether, bis(4-hydroxyphenyl) ketone, etc.

As the diphenols for use herein, preferred are bis(hydroxyphenyl)alkanes, especially bisphenol A. The carbonate precursors for use in the invention include, for example, carbonyl halides, carbonyl esters, haloformates, concretely, phosgene, diphenol dihaloformates, diphenyl carbonate, dimethyl carbonate, diethylcarbonate, etc. Other diphenols such as hydroquinone, resorcinol, catechol and the like are also usable in the invention. The diphenols mentioned herein may be used either singly or as combined.

The polycarbonate resin may have a branched structure, for which the branching agent includes 1,1,1-tris(4-hydroxyphenyl)ethane, α, α', α"-tris (4-hyroxyphenyl)-1,3, 5-triisopropylbenzene, phloroglucine, trimellitic acid, isatin-bis(o-cresol), etc. For controlling the molecular weight of the polycarbonate resin, employable are phenol, p-t-butylphenol, p-t-octylphenol, p-cumylphenol, etc.

The polycarbonate resin for use in the invention may be a copolymer having a polycarbonate moiety and a polyorganosiloxane moiety, or it may have a moiety of the copolymer. The copolymer may be a polyester-polycarbonate resin to be produced through polymerization of a polycarbonate in the presence of an ester precursor, such as a difunctional carboxylic acid (e.g., terephthalic acid) or its ester-forming derivative. Various types of different polycarbonate resins may be mixed to give mixed polycarbonate resins for use in the invention.

In view of its mechanical strength and moldability, the polycarbonate resin to be the component (A) in the invention preferably has a viscosity-average molecular weight of from 10,000 to 100,000, more preferably from 14,000 to 40,000.

(B) Styrenic Resin:

The styrenic resin to be the component (B) in the resin composition of the invention may be a polymer as prepared through polymerization of a monomer or monomer mixture of from 20 to 100% by weight of a monovinylic aromatic monomer such as styrene, α-methylstyrene or the like, from 0 to 60% by weight of a vinyl cyanide-type monomer such as acrylonitrile, methacrylonitrile or the like, and from 0 to 50% by weight of any other vinylic monomer copolymerizable with those monomers, such as maleimide, methyl (meth) acrylate or the like. The polymer includes, for example, polystyrenes (GPPS), acrylonitrile-styrene copolymers (AS resins), etc.

As the styrenic resin, also preferably used herein are rubber-like polymer-modified styrenic resins. The modified styrenic resins are preferably impact-resistant styrenic resins as produced through grafting polymerization of rubber-like polymers with styrenic monomers. The rubber-modified styrenic resins include, for example, impact-resistant polystyrenes (HIPS) as produced through additional polymerization of rubber-like polymers such as polybutadiene or the like with styrene; ABS resins as produced through additional polymerization of polybutadiene with acrylonitrile and styrene; MBS resins as produced through additional polymerization of polybutadiene with methyl methacrylate and styrene, etc. These rubber-modified styrenic resins may be combined, or may be mixed with other styrenic resins not modified with rubber such as those mentioned above, and the resin mixtures may be used in the invention.

In the rubber-modified styrenic resins, the amount of the rubber-like polymer to modify them may fall, for example, between 2 and 50% by weight, but preferably between 5 and 30% by weight. If the amount of the modifying rubber-like polymer is smaller than 2% by weight, the resin composition will have poor impact resistance. If, on the other hand, it is larger than 50% by weight, the thermal stability of the resin composition will be lowered, and the melt fluidity thereof will be also lowered. If so, the resin composition will be unfavorably gelled or yellowed. Specific examples of the rubber-like polymer include polybutadiene, acrylate and/or methacrylate-having rubber-like polymers, styrene-butadiene-styrene (SBS) rubber, styrene-butadiene rubber (SBR), butadiene-acrylic rubber, isoprene rubber, isoprene-styrene rubber, isoprene-acrylic rubber, ethylene-propylene rubber, etc.

Of those, especially preferred is polybutadiene. The polybutadiene usable herein may be any of low-cis polybutadiene (for example, having from 1 to 30 mol % of 1,2-vinyl bonds and from 30 to 42 mol % of 1,4-cis bonds) or high-cis polybutadiene (for example, having at most 20 mol % of 1,2-vinyl bonds and at least 78 mol % of 1,4-cis bonds), and even their mixtures.

(C) Flame Retardant:

Where the moldings of the invention are for office automation appliances, electric and electronic appliances and the like, they shall be resistant to flames. For these, various flame retardants may be added to the moldings. Examples of flame retardants include organic phosphorus compounds, halogen-free phosphorus compounds, halogen compounds, nitrogen compounds, metal hydroxides, red phosphorus, antimony compounds, etc. The halogen compounds include, for example, tetrabromobisphenol A, halogenopolycarbonates, copolymerized oligomers of halogenopolycarbonates, decabromodiphenyl ether, halogenopolystyrenes, halogenopolyolefins, etc. The nitrogen compounds include, for example, melamine, alkyl group or aromatic group-substituted melamines, etc.; themetal hydroxides include, for example, magnesium hydroxide, aluminium hydroxide, etc.; the antimony compounds include, for example, antimony trioxide, antimony tetroxide, etc.

However, halogen-containing flame retardants are unfavorable, as often discharging harmful substances when moldings comprising them are incinerated. Therefore, preferred are halogen-free, organic phosphorus-containing flame retardants. Any organic compounds containing phosphorus but not containing halogen are employable herein with no limitation, so far as they serve as flame retardants. As the flame retardants for use herein, however, preferred are phosphate compounds having at least one esteric oxygen atom directly bonding to a phosphorus atom. For example, preferred are phosphate compounds of the following formula (1):

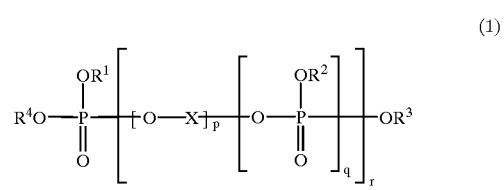

wherein $R^1$, $R^2$, $R^3$ and $R^4$ each independently represent a hydrogen atom or an organic group; X represents a divalent or higher polyvalent organic group; p is 0 or 1; q is an integer of 1 or larger; and r is an integer of 0 or larger.

In formula (I), the organic group includes, for example, substituted or unsubstituted alkyl, cycloalkyl and aryl groups, etc. The substituents for the substituted groups include, for example, alkyl groups, alkoxy groups, aryl groups, aryloxy groups, arylthio groups, etc. These substituents may be combined to give arylalkoxyalkyl groups, or may be bonded, for example, via oxygen, nitrogen or sulfur atom to give arylsulfonylaryl groups.

In formula (I), the divalent or higher polyvalent organic group X is meant to include divalent or higher polyvalent groups to be derived from the organic groups as above by removing one or more hydrogen atoms bonding to carbon atoms. For example, it includes alkylene groups, (substituted) phenylene groups, groups as derived from bisphenols of polycyclic phenols. Preferred are groups derived from bisphenol A, hydroquinone, resorcinol, diphenylolmethane, dihydroxydiphenyl, dihydroxynaphthalene, etc.

The halogen-free phosphate compounds may be monomers, oligomers, polymers or their mixtures. Concretely, they include, for example, trimethylphosphate, triethylphosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl) phosphate, diisopropylphenyl phosphate, trixylenyl phosphate, tris(isopropylphenyl) phosphate, trinaphthyl phosphate, bisphenol A bisphosphate, hydroquinone bisphosphate, resorcinol bisphosphate, resorcinol-diphenyl phosphate, trihydroxybenzene triphsophate, cresyldiphenyl phosphate, etc.

Commercially-available, halogen-free phosphates that are preferably used as the component (C) to be in the thermoplastic resin composition of the invention are, for example, TPP [triphenyl phosphate], TXP [trixylenyl phosphate], PFR [resorcinol(diphenyl phosphate)], PX200 [1,3-phenylene-tetrakis(2,6-dimethylphenyl) phosphate], PX201 [1,4-phenylene-tetrakis(2,6-dimethylphenyl) phosphate], PX202 [4,4'-biphenylene-tetrakis(2,6-dimethylphenyl) phosphate], CR733S [phenylresorcinol polyphosphate], all from Daihachi Chemical Industry.

The amount of the flame retardant to be in the composition may fall between 1 and 50 parts by weight, but preferably between 2 and 30 parts by weight, more preferably between 3 and 15 parts by weight, relative to 100 parts by weight of the resin mixture of (A) and (B). If the flame retardant content of the composition is smaller than 2 parts by weight, the composition could hardly have the intended flame retardancy. If, on the other hand, it is larger than 50 parts by weight, the heat resistance and the impact strength of the composition will be lowered. Therefore, the flame retardant content of the composition shall be comprehensively determined, depending on the necessary properties of the moldings of the composition and on the amount of the other constituent components of rubber-like elastomer, inorganic filler, etc.

The optional component (F), fluoro-olefinic resin that may be in the thermoplastic resin composition of the invention exhibits a resin melt-dropping preventing effect when the composition is fired. The fluoro-olefinic resin(F) is a polymer having a fluoro-olefinic structure, for example, including difluoroethylene polymers, tetrafluoroethylene polymers, tetrafluoroethylene-hexafluoropropylene copolymers, and copolymers of tetrafluoroethylene with fluorine-free ethylenic monomers. Preferred is polytetrafluoroethylene (PTFE) desirably having a mean molecular weight of at least 500,000, more desirably from 500,000 to 10,000,000. All types of polytetrafluoroethylene known in the art are usable herein.

More preferred is polytetrafluoroethylene having the ability to form fibrils, as its property of preventing resin melts from dropping is better. The fibril-forming polytetrafluoroethylene (PTFE) is not specifically defined, but preferred is PTFE of Type 3 stipulated in the ASTM Standard. Specific examples of PTFE of Type 3 include Teflon 6-J (from Mitsui-DuPont Fluorochemical), Polyflon D-1, Polyflon F-103, Polyflon F201L (all from Daikin Industry), CD-076 (from Asahi ICI Fluoropolymers), etc.

Others except PTFE of Type 3 are also employable herein, including, for example, Argoflon F5 (from Montefluos), Polyflon MPA, FA-100 (both from Daikin Industry), etc. These polytetrafluoroethylenes (PTFEs) may be used either singly or as combined. The fibril-forming polytetrafluoroethylenes (PTFEs) as above may be obtained, for example, by polymerizing tetrafluoroethylene in an aqueous solvent in the presence of sodium, potassium or ammonium peroxydisulfide, under a pressure of from 1 to 100 psi, at a temperature falling between 0 and 200° C., preferably between 20 and 100° C.

The fluoro-olefinic resin content of the composition may fall between 0.05 and 5 parts by weight, but preferably between 0.1 and 2 parts by weight relative to 100 parts by weight of the resin mixture of (A) and (B). If the fluoro-olefinic resin content is smaller than 0.05 parts by weight, the resin melt-dropping preventing ability of the composition will be not enough for the intended flame retardancy of the composition. However, even if the content is larger than 5 parts by weight, the effect of the fluoro-olefinic resin added could not be augmented any more, and such a large amount of the fluoro-olefinic resin, if added to the composition, will have some negative influences on the impact resistance and the outward appearance of the moldings of the composition. Therefore, the amount of the fluoro-olefinic resin to be added to the composition may be suitably determined, depending on the necessary flame retardancy of the moldings of the composition, for example, based on V-0, V-1 or V-2 in UL-94, and depending on the amount of the other constituent components.

(D) Anionic Antistatic Agent:

The anionic antistatic agent for use herein is not specifically defined, and includes, for example, salts of alkylsulfonic acids, salts of alkylarylsulfonic acids, salts of alkylphosphoric acids, salts of alkylsulfates, salts of fatty acids, salts of polyoxyethylene-alkylsulfates, salts of polyoxyethylene-alkylphosphates, etc. Also usable are alkali metal salts of carboxylic acids and sulfonic acids. For example, they include sodium, potassium or phosphonium salts of sulfonic acids having an alkyl groups such as octyl, nonyl, decyl, dodecyl, undecyl or the like group, and those of alkylbenzenesulfonic acids and alkylnaphthalenesulfonic acids. Preferred examples are sodium dodecylbenzenesulfonate, potassium dodecylbenzenesulfonate, and phosphonium dodecylbenzenesulfonate. If desired, two or more those anionic antistatic agents may be combined for use herein.

The flame-retardant polycarbonate resin composition of the invention basically comprises 100 parts by weight of a resin or resin mixture of (A) from 50 to 100% by weight, preferably from 60 to 95% by weight of a polycarbonate resin and (B) from 0 to 50% by weight, preferably from 5 to 40% by weight of a styrenic resin, from 1 to 50 parts by weight, preferably from 2 to 30 parts by weight of (C) a flame retardant, and from 0.1 to 5 parts by weight, preferably from 0.2 to 3 parts by weight of (D) an anionic antistatic agent, and has a sodium sulfate content of at most 0.05% by weight, preferably at most 0.02% by weight.

If the proportion of the component (A), polycarbonate resin is smaller than 50% by weight in the composition, the heat resistance and the mechanical strength of the composition will be poor. The styrenic resin of the component (B) is to be in the composition so as to make the composition have the necessary melt fluidity. If its proportion is smaller than 5% by weight, the component (B) could poorly exhibit its ability to improve the moldability of the composition. If, in the composition, the proportion of the component (C), flame retardant is smaller than 1 part by weight, the ability of the component (C) therein to improve the flame retardancy of the composition will be poor. If, however, it is larger than 50 parts by weight, the heat resistance, the mechanical strength and the impact resistance of the composition will be often poor. Therefore, the proportion of the flame retardant shall be suitably determined, depending on the necessary flame retardancy of the moldings of the composition, on the moldability of the composition, and even on the proportions of the other components constituting the composition.

If the proportion of the anionic antistatic agent in the composition is smaller than 0.1 parts by weight, the agent could poorly exhibit its antistatic capabilities; but if larger than 5 parts by weight, the flame retardancy of the composition will be unfavorably lowered. The anionic antistatic agent added to the flame-retardant polycarbonate resin composition of the invention additionally exhibits a quite different effect of improving the impact resistance of the composition, but the reason is not clear.

The flame-retardant polycarbonate resin composition of the invention is specifically characterized in that it comprises the constituent components noted above in specific ratios as defined herein and that it has a sodium sulfate content of at most 0.05% by weight, preferably at most 0.02% by weight. If the sodium sulfate content of the composition is larger than 0.05% by weight, the composition could not be resistant to flames even when it contains a flame retardant. Sodium sulfate that may be in the composition will be derived from the anionic antistatic agent to be in the composition, and its amount to be in the composition could be reduced or controlled by appropriately selecting the catalyst to be used in producing the anionic antistatic agents for use herein and by purifying the produced anionic antistatic agents through suitable purification means of distillation and the like. However, it has heretofore been unknown that sodium sulfate will have some influences on the flame retardancy of resin compositions containing it. Basically, in the invention, the indispensable components constituting the resin composition are specifically defined and the sodium sulfate content of the composition is also specifically controlled, thereby attaining the intended object of the invention to provide the antistatic and flame-retardant polycarbonate resin composition.

The flame-retardant polycarbonate resin composition of the invention may additionally contain (E) at least one selected from alkylene glycols, glycerins and their esters with fatty acids, in an amount of from 0.1 to 5 parts by weight relative to 100 parts by weight of the components (A) and (B). The optional component (E) is to improve the dispersibility of the component (D), anionic antistatic agent in the composition. In addition, it is further effective for reducing the amount of the necessary flame retardant to be in the composition and for improving the thermal stability of the composition. Specifically, the component (E) is effective for preventing the moldings of the composition from being unfavorably yellowed. Alkylene glycols employable herein include, for example, ethylene glycol, propylene glycol, ethylene-propylene glycol, etc. Also employable are esters of those glycols or glycerins with fatty acids having from about 5 to about 34, but preferably from about 14 to about 26 carbon atoms, such as caproic acid, capric acid, lauric acid, palmitic acid, stearic acid, behenic acid and the like. The esters may be monoesters, ester oligomers or polymers. Concretely, they may be glycerin monostearates, glycerin monobehenates, etc.

The flame-retardant polycarbonate resin composition of the invention may further contain a rubber-like elastomer as still another optional component (G) that acts to further improve the impact resistance of the moldings of the composition. The amount of the optional component (G) to be in the composition may fall between 1 and 30 parts by weight, but preferably between 2 and 15 parts by weight, relative to 100 parts by weight of the components (A) and (B).

The amount of the rubber-like elastomer to be in the composition shall be determined, depending on the total properties (e.g., impact resistance, heat resistance, rigidity) of the intended moldings. The rubber-like elastomer includes, for example, polybutadiene, polyisoprene, styrene-butadiene-styrene (SBS) rubber, styrene-butadiene rubber (SBR), butadiene-acrylic rubber, isoprene-styrene rubber, isoprene-acrylic rubber, ethylene-propylene rubber, ethylene-propylene-diene rubber, etc. Of those, preferred are powdery or granular rubber-like elastomers having a two-layered core/shell structure in which the core is of a flexible rubber material and the shell that covers the core is of a rigid resin material. After blended with a polycarbonate melt, the rubber-like elastomers of that type mostly keep their original granular condition. Since the rubber-like elastomer keeps its original granular condition after having been blended with a polycarbonate melt, it is effective for preventing the moldings of the resin composition from being troubled by surface layer peeling.

Known are various core/shell-type, grafted rubber-like elastomers that are usable herein. Commercially-available products of such elastomers include, for example, Hiblen B621 (from Nippon Zeon), KM-330 (form Rohm & Haas), Metablen W529, Metablen S2001, Metablen C223, Metablen B621 (all from Mitsubishi Rayon), etc.

Above all, preferred are those to be produced through polymerization of one or more vinylic monomers in the presence of a rubber-like polymer as obtained from monomers of essentially alkyl acrylates or alkyl methacrylates and dimethylsiloxane. In the alkyl acrylates and methacrylates, the alkyl group preferably has from 2 to 10 carbon atoms. Concretely, the alkyl acrylates and methacrylates include, for example, ethyl acrylate, butyl acrylate, 2-ethylhexyl acrylate, n-octyl methacrylate, etc. One example of the rubber-like elastomers as obtained from monomers of essentially those alkyl acrylates is a polymer to be prepared through reaction of at least 70% by weight of the alkyl acrylates with at most 30% by weight of other copolymerizable vinylic monomers such as methyl methacrylate, acrylonitrile, vinyl acetate, styrene and the like. To prepare the polymer, a polyfunctional monomer serving as a crosslinking agent, such as divinylbenzene, ethylene dimethacrylate, triallyl cyanurate, triallyl isocyanurate or the like, may be added to the polymerization system.

The vinylic monomers to be polymerized in the presence of a rubber-like polymer include, for example, aromatic vinyl compounds such as styrene, α-methylstyrene, etc.; acrylates such as methyl acrylate, ethyl acrylate, etc.; methacrylates such as methyl methacrylate, ethyl methacrylate, etc. One or more these monomers may be (co)polymerized, as combined, or may be copolymerized with any other vinylic monomers such as vinyl cyanide compounds (e.g., acrylonitrile, methacrylonitrile), vinyl esters (e.g., vinyl acetate, vinyl propionate), etc. The (co)polymerization may be effected in any known method of, for example, bulk polymerization, suspension polymerization, emulsion polymerization or the like. Preferred is emulsion polymerization.

It is desirable that the core/shell-type, grafted rubber-like elastomers thus produced in the manner mentioned above contain at least 20% by weight of the rubber-like polymer moiety. Typical examples of the core/shell-type, grafted rubber-like elastomers are MAS resin elastomers such as graft copolymers of styrene and methyl methacrylate with from 60 to 80% by weight of n-butyl acrylate. Other examples are composite rubber grafted copolymers to be prepared through graft copolymerization of a composite rubber with at least one vinylic monomer, in which the composite rubber comprises from 5 to 95% by weight of a polysiloxane component and from 5 to 95% by weight of a polyacryl (meth) acrylate rubber component as so entangled that they are not separated from each other, and has a mean grain size of from 0.01 to 1 $\mu$m or so. The composite rubber grafted copolymers are better than single rubber grafted copolymers, as their effect of improving the impact resistance of resin moldings is higher than that of the latter, single rubber grafted copolymers. Commercial products of such composite rubber grafted copolymers are available, for example, Metablen S-2001 from Mitsubishi Rayon.

The optional component (H), inorganic filler that may be in the thermoplastic resin composition of the invention is to further increase the rigidity and the flame retardancy of the moldings of the composition. The inorganic filler includes, for example, talc, mica, kaolin, diatomaceous earth, calcium carbonate, calcium sulfate, barium sulfate, glass fibers, carbon fibers, potassium titanate fibers, etc. Of those, preferred are tabular fillers of talc, mica, etc., and fibrous fillers. Talc is a hydrous silicate of magnesium, and any commercially available products of it are employable herein. Talc may contain a minor amount of aluminium oxide, calcium oxide and iron oxide, in addition to the essential components of silicic acid and magnesium oxide. In producing the resin composition of the invention, any talc even containing such minor components is employable. The inorganic filler such as talc for use in the invention generally has a mean grain size of from 0.1 to 50 $\mu$m, but preferably from 0.2 to 20 $\mu$m. Containing the inorganic filler as above, especially talc, the rigidity of the moldings of the invention is further increased and, in addition, the amount of the flame retardant, halogen-free phosphate to be in the composition could be reduced.

The amount of the component (H), inorganic filler that may be in the composition of the invention may fall between 1 to 50 parts by weight, but preferably between 2 and 30 parts by weight, relative to 100 parts by weight of the resin mixture of (A) and (B). If its amount is smaller than 1 part by weight, the inorganic filler added could not satisfactorily exhibit its effect of improving the rigidity and the flame retardancy of the moldings of the composition. However, if the amount is larger than 50 parts by weight, the impact resistance of the moldings will lower and the melt fluidity of the composition will lower. The amount of the inorganic filler to be in the composition shall be suitably determined, depending on the necessary properties of the moldings and the moldability of the composition, especially on the thickness of the moldings and the spiral flow length of the composition.

Apart from the essential components (A), (C) and (D) and one or more optional components selected from (B) and (E) to (H), the flame-retardant polycarbonate resin composition of the invention may additionally contain any other additives which are generally added to ordinary thermoplastic resins, if desired. The additives are for further improving the moldability, the outward appearance, the weather resistance and the rigidity of the moldings of the composition.

For example, the additives include phenol type antioxidant, phosphorous containing antioxidant, sulfur containing antioxidant, antistatic agents, polyamide-polyether block copolymers (for permanent static electrification resistance), benzotriazole-type or benzophenone-type UV absorbents, hindered amine-type light stabilizers (weatherproofing agents), microbicides, compatibilizers, colorants (dyes, pigments), etc. The amount of the optional additive that may be in the thermoplastic resin composition of the invention is not specifically defined, provided that it does not interfere with the properties of the composition.

The method for producing the flame-retardant polycarbonate resin composition of the invention is described. The composition may be produced by mixing and kneading the components (A), (C) and (D) in a predetermined ratio as above, optionally along with the optional components (B) and (E) to (H) and with additives as above in any desired ratio.

Formulating and mixing them may be effected in any known manner, for example, by pre-mixing them in an ordinary device, such as a ribbon blender, a drum tumbler or the like, followed by further kneading the resulting pre-mix in a Henschel mixer, a Banbury mixer, a single-screw extruder, a double-screw extruder, a multi-screw extruder, a coknedaer or the like. The temperature at which the components are mixed and kneaded generally falls between 240 and 300° C. Other components than the polycarbonate resin and the styrenic resin may be previously mixed with the polycarbonate or styrenic resin or with any other thermoplastic resin to prepare a master batch, and it may be added to the other constituent components.

Having been prepared in the manner noted above, the thermoplastic resin composition of the invention may be molded into various moldings in the melt-molding devices as above, or, after it is pelletized, the resulting pellets maybe molded into various moldings through injection molding, injection compression molding, extrusion molding, blow molding, press molding, vacuum molding of foaming. Preferably, the composition is pelletized in the melt-kneading manner as above, and the resulting pellets are molded into moldings through injection molding or injection compression molding. The composition of the invention is especially favorable to such injection molding or injection compression molding, as the mold releasability of the resulting moldings is good. For injection molding of the composition, preferred is a gas-introducing molding method so as to prevent shrinkage cavity around the moldings and to reduce the weight of the moldings.

Moldings of the thermoplastic resin composition of the invention as produced through injection molding or compression injection molding are usable as various housings and parts of office automation appliances, and electric and electronic appliances for household or industrial use, such as duplicators, facsimiles, televisions, radios, tape recorders, video decks, personal computers, printers, telephones, information terminals, refrigerators, microwave ovens, etc.

The invention is described in more detail with reference to the following Examples and Comparative Examples, which, however, are not intended to restrict the scope of the invention.

EXAMPLES 1 TO 8, AND COMPARATIVE EXAMPLES 1 TO 5

The components shown in Table 1 below were blended in the ratio indicated therein (the components (A) and (B) are in terms of % by weight, and the other components are in terms of parts by weight relative to 100 parts by weight of the total of (A) and (B)), fed into an extruder (VS40 from Tanabe Plastic Machinery), melted and kneaded therein at 260° C., and then pelletized. To all compositions of Examples and Comparative Examples, added were 0.2 parts by weight of Irganox 1076 (from Ciba-Geigy) and 0.1 parts by weight of Adekastab C (from Asahi Denka Industry) serving as, both serving as an antioxidant. The resulting pellets were dried at 80° C. for 12 hours, and then molded into test pieces through injection molding at 260° C. These test pieces were tested for their properties, and their data obtained are shown in Table 1.

The materials used for producing the test samples, and the methods for testing the samples are mentioned below.

(A) Polycarbonate: Toughlon A1900 (from Idemitsu Petrochemical).

This is a bisphenol A polycarbonate resin having a melt index (MI) of 20 g/10 min (at 280° C., under a load of 2.16 kg), and a viscosity-average molecular weight of 19000.

(B) Styrenic resin (impact-resistant polystyrene resin, HIPS): Idemitsu PS HT44 (from Idemitsu Petrochemical).

This is a polystyrene-grafted polybutadiene (rubber-like elastomer) of which the rubber-like elastomer content is 7% by weight, and this has MI of 8 g/10 min (at 200° C., under a load of 5 kg).

(C) Flame retardant:

P-1: Resorcinol bis(diphenyl phosphate), Phosphate PFR (from Asahi Denka Kogyo).

P-2: Resorcinol bis(di-2,6-dimethylphenyl phosphate), Phosphate FP-500 (from Asahi Denka Kogyo).

P-3: Triphenyl phosphate, TPP (from Daihachi Chemical).

(D) Anionic antistatic agent:

AS-1: Sodium dodecylbenzenesulfonate (having an alcohol insoluble content of 1% by weight).

AS-2: Sodium dodecylbenzenesulfonate (having an alcohol insoluble content of 7% by weight).

(E) Polyethylene glycol, having a molecular weight of 8000.

(F) Polytetrafluoroethylene (PTFE), F201L (from Daikin Chemical Industry) having a molecular weight of from 4,000,000 to 5,000,000.

(G) Rubber-like elastomer:

Core/shell-type, grafted rubber-like elastomer:
Metablen S2001 (from Mitsubishi Rayon).

This is a composite rubber-grafted copolymer having a polydimethylsiloxane content of at least 50% by weight.

(H) Talc

Talc: FFR (from Asada Flour Milling), having a mean grain size of 0.7 μm.

Testing Methods:

(1) Izod impact strength:

Measured according to ASTM D256. The temperature was 23° C., and the thickness of samples was ⅛ inches. The data are in terms of kJ/m².

(2) SFL (spiral flow length):

Measured according to an Idemitsu method. The molding resin temperature was 240° C., and the mold temperature was 60° C. Resin samples were molded into sheets having a thickness of 3 mm and a width of 10 mm under an injection pressure of 110 MPa. The data of SFL are in terms of cm.

(3) Antistatic property, indicated by surface resistivity.

A flat sheet sample having a thickness of ⅛ inches was measured for its surface resistivity (unit: Ω/□) in an atmosphere at a temperature of 23° C. and at a humidity of 50%.

(4) Flame retardancy:

Tested according to the UL94 combustion test. Samples tested had a thickness of 1.5 mm. V-0~V-2 indicate that they satisfy the practical flame retardancy. "out" means that it does not meet the stadard.

latter, and, in addition, the impact resistance of the former is much higher than that of the latter. However, the reason is not clear. When the moldings of Example 3 are compared with those of Comparative Example 4, of which the composition is similar to that of Example 3, it is understood that the impact resistance of the former is better than that of the latter, though their antistatic properties are nearly the same. In particular, it is understood that, even though the antistatic agent content and the flame retardant content of the composition of Comparative Example 4 are the same as those of the compositions of the invention, the moldings of Comparative Example 4 which are outside the scope of the invention failed in the flame retardancy test. From the test data, it is understood that the moldings of the invention have good antistatic properties and have good flame retardancy and high impact resistance.

TABLE 1

| | | | Example 1 | Example 2 | Example 3 | Example 4 | Example 5 | Example 6 | Example 7 |
|---|---|---|---|---|---|---|---|---|---|
| Formulation | (A) PC | | 82 | 83 | 82 | 80 | 86 | 86 | 94 |
| | (B) PS | | 18 | 17 | 18 | 20 | 14 | 14 | 6 |
| | (C) Flame retardant | P-1 | 10 | 10 | 10 | 7 | — | — | — |
| | | P-2 | — | — | — | — | 5 | 5 | — |
| | | P-3 | — | — | — | — | — | — | 5 |
| | (D) Antistatic agent | AS-1 | 1.0 | 1.5 | 1.5 | 1.5 | 2.0 | 1.0 | 1.0 |
| | | AS-2 | — | — | — | — | — | — | — |
| | (E) PEG | | — | — | — | — | — | 1.0 | — |
| | (F) PTFE | | — | 0.5 | 0.5 | 0.2 | 0.2 | 0.2 | 0.5 |
| | (G) Rubber-like elastomer | | — | — | 5 | — | 5 | 5 | — |
| | (H) Talc | | — | — | — | 10 | 20 | 20 | 10 |
| | Sodium sulfate content, wt. % | | 0.010 | 0.015 | 0.015 | 0.015 | 0.020 | 0.010 | 0.010 |
| Test Data | (1) IZOD (kJ/m$^2$) | | 32 | 30 | 68 | 35 | 14 | 16 | 27 |
| | (2) SFL (cm) | | 35 | 35 | 37 | 30 | 27 | 30 | 23 |
| | (3) Surface resistivity (Ω/□) | | $3 \times 10^{13}$ | $5 \times 10^{12}$ | $5 \times 10^{12}$ | $3 \times 10^{13}$ | $3 \times 10^{12}$ | $3 \times 10^{12}$ | $3 \times 10^{13}$ |
| | (4) Flame retardancy, UL94 | | V-2 | V-0 | V-0 | V-0 | V-1 | V-1 | V-0 |

TABLE 1 (continued)

| | | | Comp. Example 1 | Comp. Example 2 | Comp. Example 3 | Comp. Example 4 | Comp. Example 5 | Example 8 |
|---|---|---|---|---|---|---|---|---|
| Formulation | (A) PC | | 82 | 82 | 82 | 82 | 83 | 82 |
| | (B) PS | | 18 | 18 | 18 | 18 | 17 | 18 |
| | (C) Flame retardant | P-1 | 10 | — | 10 | 10 | 10 | 10 |
| | | P-2 | — | — | — | — | — | — |
| | | P-3 | — | — | — | — | — | — |
| | (D) Antistatic agent | AS-1 | — | — | — | — | 6.0 | 1 |
| | | AS-2 | — | 1.0 | 1.0 | 1.5 | — | — |
| | (E) PEG | | — | — | — | — | — | 1 |
| | (F) PTFE | | 0.5 | 0.5 | 0.5 | 0.5 | 0.5 | — |
| | (G) Rubber-like elastomer | | — | — | — | 5 | — | — |
| | (H) Talc | | — | — | — | — | — | — |
| | Sodium sulfate content, wt. % | | — | 0.010 | 0.070 | 0.105 | 0.080 | 0.010 |
| Test Data | (1) IZOD (kJ/m$^2$) | | 13 | 25 | 20 | 52 | 4 | 30 |
| | (2) SFL (cm) | | 34 | 20 | 35 | 37 | 40 | 37 |
| | (3) Surface resistivity (Ω/□) | | $5 \times 10^{17}$ | $3 \times 10^{13}$ | $8 \times 10^{13}$ | $8 \times 10^{12}$ | $2 \times 10^{11}$ | $5 \times 10^{11}$ |
| | (4) Flame retardancy, UL94 | | V-0 | OUT | OUT | OUT | OUT | V-2 |

As is obvious from the data in Table 1, the moldings of the flame-retardant polycarbonate resin composition of the invention are better than the comparative moldings. Specifically, when the moldings of Example 2 are compared with those of Comparative Example 1, of which the composition is similar to that of Example 2, it is understood that the surface resistivity of the former is lower than that of the From the data of the samples of Comparative Example 5, it is understood that the composition having an increased sodium sulfate content could not be resistant to flames and the impact resistance of the moldings of the composition is significantly lowered. Owing to their excellent properties, the injection moldings of the composition of the invention are especially favorable to housings and various parts for electric and electronic appliances that are required to have good antistatic properties and good flame retardancy. Much enlarged applications of the flame-retardant polycarbonate resin composition of the invention are expected.

As described in detail hereinabove, the flame-retardant polycarbonate resin composition of the invention comprises a resin component of a polycarbonate resin (PC) and optionally a styrenic resin (PS), and contains a flame retardant and a specific antistatic agent, and the sodium sulfate content of the composition is specifically controlled to be not higher than a predetermined level. Therefore, still being well resistant to flames, the composition could have good antistatic properties. Unexpectedly, in addition, the impact resistance of the moldings of the composition is significantly increased. In particular, when the composition contains a non-halogen phosphate as the flame retardant, and when it additionally contains a fluoro-olefinic resin, the flame retardancy of the moldings of the composition is much enhanced, and still having good moldability and impact resistance. Further, when the composition still additionally contains a rubber-like elastomer and an inorganic filler, the impact resistance, the rigidity, the heat resistance and the flame retardancy of the moldings of the composition are greatly enhanced. The composition containing a non-halogen phosphate as the flame retardant solves the problem of environmental pollution as well.

What is claimed is:

1. A flame-retardant polycarbonate resin composition, which comprises 100 parts by weight of a resin or resin mixture of (A) from 50 to 100% by weight of a polycarbonate resin, and (B) from 0 to 50% by weight of a styrenic resin, (C) from 1 to 50 parts by weight of a flame retardant, and (D) from 0.5 to 5 parts by weight of an anionic anti-static agent which is selected from the group consisting of salts of alkylsulfonic acids, salts of alkylaryl sulfonic acids, metal salts of sulfonic acids, and salts of alkyl sulfates, and wherein said polycarbonate resin composition has a sodium sulfate content of not more than 0.05% by weight.

2. The flame-retardant polycarbonate resin composition of claim 1, wherein the flame-retardant is a non-halogen phosphate.

3. The flame-retardant polycarbonate resin composition of claim 1, which further comprises from 0.05 to 5 parts by weight, relative to 100 parts by weight of the resin or resin mixture of (A) and (B), of (F) a fluoro-olefinic resin.

4. The flame-retardant polycarbonate resin composition of claim 3, wherein the fluoro-olefinic resin has the ability to form fibrils.

5. The flame-retardant polycarbonate resin composition of claim 1, wherein the resin mixture comprises (A) from 50 to 95% by weight of a polycarbonate resin and (B) from 5 to 50% by weight of a styrenic resin, wherein the styrenic resin is a rubber polymer-modified styrenic resin.

6. The flame-retardant polycarbonate resin composition of claim 1, which further comprises from 1 to 30 parts by weight, relative to 100 parts by weight of the resin or resin mixture of (A) and (B), of (G) a rubber elastomer.

7. The flame-retardant polycarbonate resin composition of claim 6, wherein the rubber elastomer (G) is a core/shell grafted rubber elastomer.

8. The flame-retardant polycarbonate resin composition of claim 1, which further comprises from 1 to 50 parts by weight, relative to 100 parts by weight of the resin or resin mixture of (A) and (B), of (H) an inorganic filler.

9. An injection molding of the flame-retardant polycarbonate resin composition of claim 1.

10. The injection molding of claim 9, which is incorporated in housings or parts of office automation appliances, or an electric or electronic appliances for household industrial use.

11. A flame-retardant polycarbonate resin composition, which comprises 100 parts by weight of a resin or resin mixture of (A) from 50 to 100% by weight of a polycarbonate resin, and (B) from 0 to 50% by weight of a styrenic resin, (C) from 1 to 50 parts by weight of a flame retardant, and (D) from 0.1 to 5 parts by weight of an anionic anti-static agent, and which has a sodium sulfate content of at most 0.05% by weight, and which further comprises from 0.1 to 5 parts by weight, relative to 100 parts by weight of the resin or resin mixture of (A) and (B), of (E) at least one selected from the group consisting of alkylene glycols, glycerins, and esters thereof with fatty acids.

12. The flame-retardant polycarbonate resin composition of claim 11, wherein the flame retardant is a non-halogen phosphate.

13. The flame-retardant polycarbonate resin composition of claim 11, which further comprises from 0.05 to 5 parts by weight, relative to 100 parts by weight of the resin or resin mixture of (A) and (B), of (F) a fluoro-olefinic resin.

14. The flame-retardant polycarbonate resin composition of claim 13, wherein the fluoro-olefinic resin has the ability to form fibrils.

15. The flame-retardant polycarbonate resin composition of claim 11, wherein the resin mixture comprises (A) from 50 to 95% by weight of a polycarbonate resin and (B) from 5 to 50% by weight of a styrenic resin, wherein the styrenic resin is a rubber polymer-modified styrenic resin.

16. The flame-retardant polycarbonate resin composition of claim 11, which further comprises from 1 to 30 parts by weight, relative to 100 parts by weight of the resin or resin mixture of (A) and (B), of (G) a rubber elastomer.

17. The flame-retardant polycarbonate resin composition of claim 16, wherein the rubber elastomer (G) is a core/shell grafted rubber elastomer.

18. The flame-retardant polycarbonate resin composition of claim 11, which further comprises from 1 to 50 parts by weight, relative to 100 parts by weight of the resin or resin mixture of (A) and (B), of (H) an inorganic filler.

* * * * *